United States Patent [19]

Murasawa

[11] Patent Number: 5,173,386
[45] Date of Patent: Dec. 22, 1992

[54] TITANIUM DIOXIDE AGGREGATES PROCESS FOR PRODUCING SAME AND ELECTROPHOTOGRAPHIC PHOTOSENSITIVE MATERIAL CONTAINING SAME

[75] Inventor: Sadao Murasawa, Itami, Japan

[73] Assignee: Ishihara Sangyo Kaisha, Ltd., Osaka, Japan

[21] Appl. No.: 458,349

[22] Filed: Dec. 28, 1989

[30] Foreign Application Priority Data

Dec. 28, 1988 [JP] Japan .................................. 63-332298
Dec. 28, 1988 [JP] Japan .................................. 63-332299
Feb. 2, 1989 [JP] Japan .................................. 1-024583

[51] Int. Cl.$^5$ ...................... G03G 5/08; C01G 23/047; C09C 1/36
[52] U.S. Cl. ........................................ 430/84; 430/95; 423/610; 423/612; 423/615; 423/616; 106/436; 106/437; 106/438; 106/449
[58] Field of Search .................... 430/84, 95; 423/610, 423/612, 615, 616; 106/436, 437, 438, 449

[56] References Cited

U.S. PATENT DOCUMENTS

| | | |
|---|---|---|
| 2,480,869 | 9/1949 | Mayer . |
| 3,640,745 | 2/1972 | Darr et al. ...................... 423/613 X |
| 3,837,850 | 9/1974 | Miyataka ............................... 430/84 |
| 3,862,297 | 1/1975 | Claridge et al. .................... 423/615 |
| 4,150,986 | 4/1979 | Takahata et al. ................. 252/501.1 |
| 4,525,441 | 6/1985 | Takahata et al. ...................... 430/46 |

FOREIGN PATENT DOCUMENTS

| | | |
|---|---|---|
| 0186370 | 7/1986 | European Pat. Off. . |
| 47-29117 | 7/1972 | Japan . |
| 58-40177 | 9/1983 | Japan . |
| 58-40178 | 9/1983 | Japan . |
| 63-35977 | 7/1988 | Japan . |
| 1009379 | 11/1965 | United Kingdom .................. 430/84 |

OTHER PUBLICATIONS

Chemical Abstracts vol. 98, No. 10, Mar. 7, 1983, p. 575, abstract No. 81496q, Columbus, Ohio, US; & JP-A-57 96352 (Ishihara Sangyo Kaisha Ltd.) Jun. 15, 1982.
Chemical Abstracts vol. 104, No. 12, Mar. 24, 1986, p. 707, abstract No. 99283v, Columbus, Ohio, US; H. Harada et al.: "Preparation of titanium dioxide from titanium tetrachloride and its photocatalytic activity. Effect of calcination temperature, particle size and crystal contents on photocatalytic activity in methanol-water solution" & Res. Bull. Meisei Univ. Phys. Sci. Eng. 1985, vol. 21, pp. 45-53.
Chemical Abstracts vol. 104, No. 18, May 5, 1986, p. 99, abstract no. 150828f, Columbus, Ohio, US; N. N. Stremilova et al.: "Effect of water-soluble salts on the pigment properties of titanium dioxide" & Labkokras. Mater. Ikh Primen., 1985, vol. 6, pp. 25-27.
"Titanium", published by the Ronald Press Company, 1949, U.S.A., pp. 160-173.

Primary Examiner—Roland Martin
Attorney, Agent, or Firm—Cushman, Darby & Cushman

[57] ABSTRACT

The present invention provides novel titanium dioxide aggregates especially suitable for an electrophotographic photosensitive material. This titanium dioxide aggregates comprise sintered aggregates of fine primary particles and have a rutile type crystal structure and an oil absorption of 35-65. This titanium dioxide aggregates which are treated with a mineral acid is also provided. There is also provided an electrophotograpic photosensitive material which contains such titanium dioxide in a photosensitive layer.

16 Claims, 2 Drawing Sheets

TITANIUM DIOXIDE AGGREGATES PROCESS FOR PRODUCING SAME AND ELECTROPHOTOGRAPHIC PHOTOSENSITIVE MATERIAL CONTAINING SAME

BACKGROUND OF THE INVENTION

1. Field of the Invention

The present invention relates to titanium dioxide aggregates and titanium dioxide aggregates treated with a mineral acid which can be applied to electrophotographic photoconductors, substrates for an electroconductivity-imparting agent, substrates for an antistatic agent, catalysts and catalyst carriers and fillers and are especially suitable for electrophotographic photoconductors.

2. Description of the Art

Titanium dioxide has high hiding power and coloring power and besides gives excellent gloss to a coating film and is used mostly as a pigment. Most of the commercially available ones are of an anatase or rutile type of 0.15–0.35$\mu$ in avarage particle size and are subjected to surface treatment, for example, with hydroxides of aluminum and silicon in order to improve dispersibility, gloss, weathering resistance, and the like depending on purposes.

On the other hand, zinc oxide is used in a large amount as electrophotographic photoconductors and, on the other hand, applying to electrophotography titanium dioxide in place of zinc oxide have been studied and developed.

Titanium dioxide as photoconductor is reported, for example, in Japanese Patent Kokoku (Post-Exam. Publn.) No. 47-29117. This titanium dioxide has an anatase type crystal structure and comprises particles having an average particle size of 0.05–0.15$\mu$, at least 70% by weight of which are within the range of 0.08–0.18$\mu$.

Recently, with the progress of electrophotographic technique, images of higher quality are demanded and the development of photoconductor titanium dioxide further excellent in electrophotographic characteristics has been desired.

SUMMARY OF THE INVENTION

The object of the present invention is to meet the needs of market by providing novel titanium dioxide aggregates and novel titanium dioxide aggregates treated with a mineral acid, which are applicable to electrophotographic photoconductors, substrates for an electroconductivity-imparting agent or for an antistatic agent, catalysts, catalyst carriers, fillers, a process for preparing the same and an electrophotographic photosensitive material containing the same.

BRIEF DESCRIPTION OF THE DRAWINGS

FIG. 3 is an electron microscopic photograph, which shows the particle structure of the titanium dioxide which was fired at a too high calcination temperature (1000° C.). FIG. 4 is an electron microscopic photograph which shows the particle structure of titanium dioxide when it was too much ground.

Figure 1:
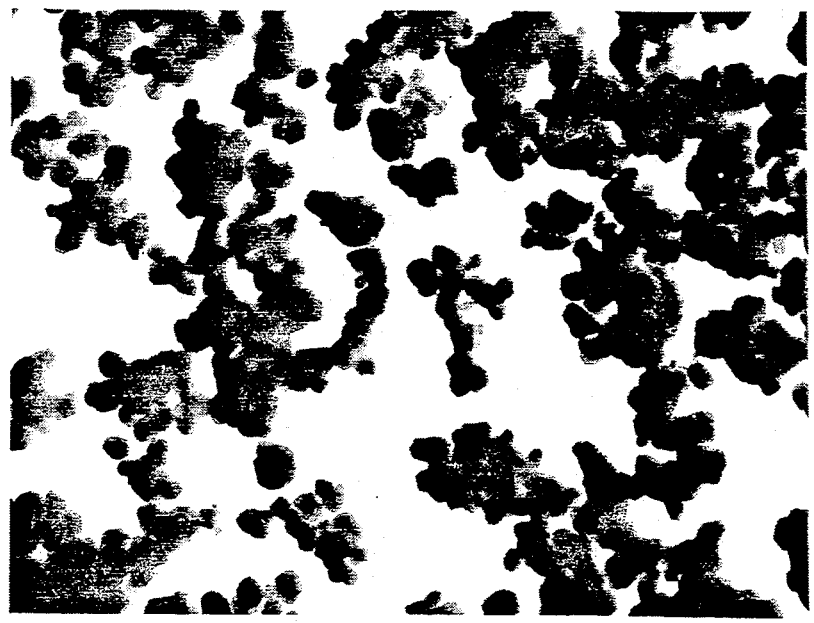
FIGS. 1 and 2 are electron microscopic photographs which show the particle structure of the titanium dioxide aggregates of the present invention.

Magnifying power of these microscopic photographs are ×10,000.

DESCRIPTION OF PREFERRED EMBODIMENTS

The inventors have conducted research to use titanium dioxide as a photoconductor in place of zinc oxide for a long time and have elucidated that images higher in resolution and sharp in contrast can be obtained when a specific titanium dioxide is used together with a binder resin and various auxiliaries which conform to the specific titanium dioxide than when zinc oxide is used.

In order to meet the needs of market, the inventors have conducted further research and, as a result, it has been found that the object can be attained by providing novel titanium dioxide aggregates which are sintered aggregates of fine primary particles having a rutile type crystal structure and having an oil absorption of 35–65 and this novel titanium dioxide aggregates which are further treated with a mineral acid and an electrophotographic photosensitive material which utilizes these novel titanium dioxide aggregates as a photoconductor. They have further found that these titanium dioxide aggregates are applicable to substrates for a conductivity-imparting agent or antistatic agent, catalysts or carriers for catalysts and fillers.

The titanium dioxide aggregates of the present invention can be prepared, for example, by heating an acidic aqueous solution in which titanium is dissolved, hydrolyzing it in the presence of a rutile type seed crystal for hydrolysis to form hydrous titanium dioxide precipitates and calcining at 700°–900° C. the precipitates to sinter the primary particles or by treating the sintered primary particles with a mineral acid.

The acidic aqueous solution in which titanium is dissolved includes, for example, aqueous solutions of titanium sulfate, titanium tetrachloride and the like.

The rutile type seed crystal for hydrolysis is such that used for acceleration of formation of rutile and adjustment of particle size in thermal hydrolysis of titanium dioxide of a pigment grade and examples thereof are mentioned in "TITANIUM", pages 160–173 published from The Ronald Press Company in U.S.A. in 1949 and Japanese Patent Kokoku (Post-Exam. Publn.) No. 32-415.

The rutile type seed crystal for hydrolysis suitable for the preparation of the titanium dioxide aggregates of the present invention is a fine titania sol having a rutile type crystal structure which is a sol of fine hydrated titanium oxide which shows a peak of rutile type crystal measured by X-ray diffractometry. Normally, the average crystallite size thereof is in the range of about 50–120Å.

This fine titania sol can be prepared, for example, (1) by hydrolyzing an aqueous titanium tetrachloride solution of 150–220 g/l as $TiO_2$ by heating it at its boiling point for 2–10 hours, (2) by neutralizing an aqueous titanium sulfate or aqueous titanium tetrachloride solution of 150–220 g/l as $TiO_2$ kept at 5°–30° C. with an aqueous alkali solution such as sodium hydroxide and aging the resulting colloidal precipitates at 60°–80° C. for 1–10 hours or (3) introducing amorphous titanium hydroxide such as metatitanic acid or orthotitanic acid into an aqueous sodium hydroxide solution, heating the solution at 80° C.—boiling point for 1–10 hours, followed by filtrating and washing and heating in an aqueous hydrochloric acid solution at 80° C.—boiling point for 1–10 hours.

As to thermal hydrolysis conditions for the above examples of preparing titanium dioxide aggregates, a difference from the case of preparation of a general pigment grade titanium dioxide is that a lower temperature of 65°–85° C. is desired.

The hydrous titanium dioxide obtained by adding a rutile type seed crystal for hydrolysis to an acidic aqueous solution containing titanium dissolved therein, followed by heating and hydrolyzing is calcined at 700°–900° C., preferably 750°–850° C. A difference in calcination step from the case of preparation of a general pigment grade titanium dioxide is that the calcination temperature is low and the addition of sintering inhibitors such as phosphoric acid and phosphoric acid compounds such as orthophosphoric acid and alkali metal compounds such as potassium hydroxide is not needed. If the calcination temperature is too low, the hydrous titanium dioxide cannot be fired into the desired rutile type titanium dioxide and if it is too high, sintering extends to the whole surface of primary particles to cause intimate fusion and thus the desired titanium dioxide aggregates having much void cannot be formed.

The resulting desired fired product is ordinarily roughly ground and then classified. In this grinding, if grinding energy is great, the obtained titanium dioxide aggregates are ruptured into primary particles. Therefore, when the conditions are such that calcination can be well controlled, it is preferred to conduct the classification without the rough grinding.

For the treatment of the fired titanium dioxide aggregates with a mineral acid, normally an aqueous solution of the mineral acid is used and the treatment is carried out by suspending and immersing titanium dioxide aggregates in the aqueous solution of 0.0005–20 in normality.

The mineral acids include, for example, sulfuric acid, nitric acid, hydrochloric acid and hydrofluoric acid, and hydrofluoric acid is preferred. These mineral acids may be used singly or in combination of two or more.

When the mineral acid is sulfuric acid, nitric acid or hydrochloric acid, the treatment can be carried out in accordance with the disclosure of Japanese Patent Kokoku (Post-Exam. Publn.) No. 58-40178. However, such vigorous stirring as to break the shape of titanium dioxide aggregates should be avoided. These mineral acids are usually used in a concentration of 0.1 N or higher, preferably 0.1–10 N. The higher concentration, the lower treating temperature and the shorter treating time can be used. For example, when an aqueous solution of a high concentration of 6–10 N is used, the treatment can be carried out at about 60° C. for about 0.5–2 hours. When the concentration is low, the desired effect can be obtained by raising the temperature or prolonging the treating time. For example, in case a low concentration aqueous solution of 0.1–2 N is used, the treatment may be carried out at the boiling point for about 1–3 hours.

When the mineral acid is hydrofluoric acid, the treatment can be carried out in accordance with Japanese Patent Kokoku (Post-Exam. Publn.) No. 63-35977, but in case of the titanium dioxide aggregates of the present invention, it has been surprisingly found that it is desired to conduct the treatment so that fluorine is substantially not retained, which is different from the teaching of the above patent. Therefore, it is not needed to positively carry out the immersing treatment at a high temperature and washing is desirably sufficiently carried out. Hydrofluoric acid is normally used as an aqueous solution for the treatment and concentration thereof is usually 0.0005–20 N, preferably 0.05–0.1 N. In this case, too, the immersing treatment should be carried out without such vigorous stirring as to break the shape of titanium dioxide aggregates.

In the treatment with a mineral acid, if the concentration of the mineral acid is too low, the desired effect cannot be obtained and if it is too high, the solubility of titanium dioxide increases, which is not preferred. Furthermore, in the treatment with the mineral acid, it sometimes occurs that further preferable advantages can be brought about when a water-soluble fluorine compound such as ammonium fluoride, potassium fluoride, lithium fluoride, zinc fluoride or the like is allowed to be present in the mineral acid. The solid matter which has been subjected to the immersing treatment with the mineral acid is sufficiently washed so that the anion is substantially not retained and, if necessary, dehydrated and dried. Titanium dioxide aggregates obtained by the mineral acid treatment is superior to titanium dioxide aggregates which has not been subjected to this treatment in electrophotographic characteristics such as photosensitivity, dark decay and moisture resistance as shown in the test examples referred to hereinafter.

The titanium dioxide aggregates of the present invention have a rutile type crystal structure in secondary particles and have the shape of a cluster of grapes or of such a cluster which is irregularly divided into some portions as shown in the electron microscopic photograph of FIG. 1. Respective primary particles which correspond to respective grains of grapes are sintered together with the adjacent particles, but this sintering is not so strong as extending to the whole surface of the particle and the aggregation of the primary particles is loose and the titanium dioxide aggregates are rich in void. This will be recognized from irregularities, cavities and shades seen in the titanium dioxide aggregate particles shown in the electron microscopic photograph of FIG. 1. Most of the titanium dioxide aggregate particles have a size of 1–5μ.

As explained above, the titanium dioxide aggregates of the present invention are fundamentally different in shape and size from a titanium dioxide of pigment grade or titanium dioxide as electrophotographic photoconductor disclosed in Japanese Patent Kokoku (Post-Exam. Publn.) No. 47-29117.

As can be seen from the shape, the titanium dioxide aggregates of the present invention have a high oil absorption of 35–65. On the other hand, in view of the properties needed as pigment, the titanium dioxide of pigment grade is not desired to have a high oil absorption and generally has an oil absorption of 15–25. This oil absorption is a value measured by the following method. That is, 2–5 g of a sample dried at 105°–110° C. for 2 hours is taken on a glass plate and a purified linseed oil of 4 or less in acid value is dropped little by little to the center of the sample from a buret with rubbing-out by a spatula at every dropping. The operation of dropping and rubbing-out is repeated and when the sample becomes a rod for the first time, the operation is stopped and the amount of the purified linseed oil needed is measured and the oil absorption is calculated from the following formula.

$$\text{Oil absorption} = \frac{\text{Amount of linseed oil (g)} \times 100}{\text{Amount of sample (g)}}$$

In preparation of the titanium dioxide aggregates of the present invention, most of the fired product comprises primary particles when a sintering inhibitor such as phosphoric acid or potassium hydroxide is used in a suitable amount at the calcination step as disclosed in the above-mentioned Japanese Patent Kokoku (Post-Exam. Publn.) No. 47-29117. The average particle size (Heywood diameter based on weight) of this primary particle titanium dioxide is usually within the range of 0.05–0.25µ (when the same grinding and classifying as carried out in the case of the preparation of titanium dioxide of pigment grade are conducted).

Figure 3:
FIGS. 3 and 4 are electron microscopic photographs which show the particle structure of a comparative titanium dioxide.

Furthermore, in the preparation of the titanium dioxide aggregates of the present invention, the fired product prepared by employing a calcination temperature of 1000° C., primary particles fusing intimately with each other due to sintering as shown in the electron microscopic photograph of FIG. 3 and which are small in oil absorption, being different from titanium dioxide aggregates large in void.

In order to improve the electrophotographic characteristics of the titanium dioxide aggregates of the present invention, it is effective to allow to exist, for example, at least one compound which contains an element (metal) selected from the group consisting of lithium, zinc, magnesium, calcium, strontium and barium, before calcination of hydrous titanium dioxide as mentioned in Japanese Patent Kokoku (Post-Exam. Publn.) No. 58-40177. This improvement provides advantages in electrophotographic characteristics such as a charged initial potential, dark decay and light decay. As the compound containing the above metals, there may be used oxides, hydroxides, halides, nitrates, sulfates, organic acid salts of the metals. The amount of the compound added is generally 0.001–5 mol %, preferably 0.01–5 mol % based on $TiO_2$ and especially when the metal is lithium, 0.02–0.2 mol % in terms of Li (based on $TiO_2$) is preferred and when the metal is zinc and others, 0.1–5 mol % (based on $TiO_2$) in terms of metal is preferred. Zinc has conspicuous advantages in improvement of dark decay as compared with other metals.

The titanium dioxide aggregates of the present invention, the surface of which is coated, for example, with a tin oxide or tin oxide-containing antimony is advantageous, for example, as conductivity-imparting agents for electrostatic recording sheets and electrophotographic photosensitive sheets and antistatic agents for fibers and plastics and is preferred as substrates for these materials. Methods usable for coating the surface of the titanium dioxide aggregates with a tin oxide or tin oxide-containing antimony are mentioned, for example, in Japanese Patent Kokoku (Post-Exam. Publn.) No. 58-39175 and Japanese Patent Kokai (Laid-Open) Nos. 56-41603, 56-114215, 56-114218, 56-140028, 56-156604 and 61-286221. The amount of the tin oxide in the coating layer on the surface of the titanium dioxide aggregate particles is preferably 1–30% by weight as $SnO_2$ based on titanium dioxide in the substrate and the amount of antimony in the coating layer is preferably 5–30% by weight as $Sb_2O_3$ based on $SnO_2$.

Furthermore, as seen in catalysts or catalyst carriers mainly composed of titanium dioxide, the effect to improve catalytic activity is exhibited by the titanium dioxide aggregates on which is supported at least one ion selected from the group consisting of iron, niobium, thallium, molybdenum, nickel, tungsten, cobalt, copper, and cerium. The titanium dioxide aggregates and the improved one can be used, for example, as photooxidation reaction catalyst of hydrocarbons, reduction reaction catalyst for NOx or carriers therefor.

The titanium dioxide aggregates of the present invention can be used as fillers for coating compositions and plastics when a tough coating film and molded product are required.

As explained above, the titanium dioxide aggregates of the present invention is suitable as photoconductive material and production of electrophotographic material of a so-called CPC type using the titanium dioxide can be performed by dispersing a titanium dioxide powder in a binder resin to prepare a coating liquid, coating this coating liquid on an electroconductive support and drying the coat to form a photosensitive layer on the support. As the electroconductive support, various supports may be used and examples thereof are papers and plastic films given with electroconductivity by coating, impregnating or filling them with various conductivity imparting agents and metallic sheets which are commonly used in the electrophotographic field. As the binder resin which forms a photosensitive layer, there may be used various resins such as acrylic resins, alkyd resins, polyester resins, vinyl resins, silicone resins, amino resins and polyurethane resins. These may be used singly or as a mixture.

Moreover, in production of the electrophotographic photosensitive materials of the present invention, various agents can be added in order to improve electrophotographic characteristics such as photosensitivity, charging speed and charging dark decay and their stability with time. These improving agents include, for example, spectral sensitizing agents, for example, dyes such as cyanine, xanthene, phthalein, triphenylmethane, diphenylmethane, oxazine, thiazine, and anthraquinone dyes. These may be used singly or in combination. In this case, when the photosensitive layer composed of the titanium dioxide aggregates of the present invention is sensitized with dyes so as to have a spectral sensitivity in a relatively longer wavelength region, especially from a near infrared region to infrared region and exposure is carried out with a laser beam using, for example, a semiconductor laser which has recently been particularly noticed, various dyes can be used as the sensitizing dyes and when cyanine dyes are used, preferred cyanine dyes are those which have polar groups such as a carboxyl group, sulfonyl group and hydroxyl group in molecular structure and besides three or more methine groups. It is much desired for enhancing stability of sensitizing action with these sensitizing dyes to use, for example, various organic acids or acid anhydrides thereof in combination with the sensitizing dyes. As the organic acids or acid anhydrides thereof, there may be used various ones, for example, aromatic cyclic acids or acid anhydrides thereof such as phthalic acid or phthalic anhydride and cyclic anhydride of aliphatic dicarboxylic acids such as maleic anhydride. Sometimes, it is further desired to use a higher fatty acid compound such as stearic acid in combination with the above acid anhydrides.

The surface of photosensitive layer of the thus produced electrophotographic photosensitive material of the present invention has a gloss ratio of specular gloss at 45°—45° and specular gloss at 45°–0° of 0.7–2, preferably 0.7–1.

The reason for the electrophotographic photosensitive material of the present invention exhibiting excellent electrophotographic characteristics due to the specific range of gloss ratio possessed by the photosensitive material has not yet been theoretically investigated. However, it can be supposed that titanium dioxide aggregates dispersed in the photosensitive layer are in such a state that incident light is readily scattered due to the fact that the shape and size of the titanium dioxide aggregates, and the packing behavior of the titanium dioxide aggregates in the photosensitive layer are under the optimum conditions. Therefore, utilization of light in the photosensitive layer which is important for electrophotographic photosensitive material is enhanced and as a result electrophotographic characteristics such as photosensitivity is improved.

The present invention will be illustrated with reference to some following examples and comparative examples.

EXAMPLE 1

An aqueous solution containing 200 g/l of titanium tetrachloride was subjected to hydrolysis at 75° C. for 2 hours in the presence of a hydrolytic rutile type seed crystal to precipitate hydrated titanium oxide. This hydrolytic rutile type seed crystal was prepared by adding sodium hydroxide to an aqueous solution containing 200 g/l of titanium tetrachloride in terms of $TiO_2$ while keeping the aqueous solution at 20° C. to perform neutralization and aging the resulting colloidal precipitate at 70° C. for 2 hours. This seed crystal was allowed to be present in such an amount as containing 8 mol % of Ti per Ti in the aqueous titanium tetrachloride solution. The precipitate produced by the above hydrolysis was subjected to twice of decantation and washing with water, then filtration, repulping and neutralization with ammonia. Yield of $TiO_2$ by the hydrolysis was 95%. To the resulting neutralyzation product was added ZnO fine powder in an amount corresponding to 2 mol % of $TiO_2$ in the neutralization product, followed by mixing and filtration. The precipitated cake was dried and then calcined at 780° C. for 2 hours.

This fired product was introduced into water to prepare a slurry (containing 400 g/l in terms of $TiO_2$) and a small amount of water-glass was added as a dispersing agent to the slurry. The slurry was adjusted to a pH of about 10 with sodium hydroxide and stirred. Then, particles of larger than about 5μ are removed by a static classification method and the solid matter was fractionated and dried by a usual method to obtain the titanium dioxide aggregates of the present invention (sample A). This product shows a shape as seen in the electron microscopic photograph of FIG. 1 and had an oil absorption of 45.

The resulting titanium dioxide aggregates were subjected to the application treatment with 1-(2-carboxylethyl)-4-[3-(3-ethylbenzothiazoline-2-ylidene)-1-propene-1-yl]quinolinium iodide as a sensitizing dye by a conventional method. The amount of the sensitizing dye applied was 0.003% by weight of $TiO_2$.

16 g of the titanium dioxide aggregates applied with the sensitizing dye, 0.6 g of zinc naphthenate (8% by weight in terms of Zn), 12.7 g of AROSET 5804XC and 14.4 ml of xylene were lightly mixed by a paint shaker containing glass beads to obtain a paste.

This paste was coated at a thickness of 15μ on a paper subjected to electroconductive treatment by a doctor blade and dried at 120° C. for 3 minutes to obtain an electrophotographic photosensitive material of the present invention. This was subjected to the measurement of photosensitivity, dark decay and specular gloss and the results are shown in Table 1.

Photosensitivity was measured in the following manner. That is, the photosensitive material was charged with 300V by a dynamic method using paper analyzer EPA-8100 of Kawaguchi Denki Co. and then subjected to continuous exposure and time required for decaying the potential to 60V was measured. The photosensitivity was expressed by the time required. Therefore, the smaller value means higher sensitivity. Exposure was conducted using a tungsten light source and through a red light filter with adjusting the illuminance on the surface of the photosensitive material to 1000 lux with white light.

Dark decay was obtained from the formula: $(V_0-V_{20})/V_0 \times 100$ wherein $V_0$ is potential when the photosensitive material was corona charged at $-6$ KV for 20 seconds by dynamic method using paper analyzer EPA-8100 manufactured by Kawaguchi Denki Co. and $V_{20}$ is potential when just after the potential reached $V_0$, corona charging was discontinued and the photosensitive material was left in the dark place for 20 seconds.

Gloss ratio was obtained in the following manner. That is, 45°—45° specular gloss (x) and 45°-0° specular gloss (y) of the surface of the photosensitive layer were measured by gloss meter (GM-26 manufactured by Murakami Shikisai Gijutsu Kenkyusho) and the gloss ratio was expressed by the ratio (x)/(y).

EXAMPLE 2

Figure 2:

Hydrofluoric acid was added to the slurry obtained by removing particles of larger than about 5μ by a static classification method in Example 1 so that the concentration of hydrofluoric acid in the slurry was 3% by weight, followed by immersion treatment for 1 hour under gentle stirring. After the treatment, the solid matter in the slurry was filtered, washed and dried at 300° C. to obtain the titanium dioxide aggregates of the present invention (sample B). This product showed the shape as seen in the electron microscopic photograph of FIG. 2 and had an oil absorption of 47.

Then, electrophotographic photosensitive material of the present invention was prepared in the same manner as in Example 1 and photosensitivity, dark decay and specular gloss were measured in the same manner as in Example 1. The results are shown in Table 1.

EXAMPLE 3

Titanium dioxide aggregates of the present invention were prepared in the same manner as in Example 2 except that hydrochloric acid was added in place of hydrofluoric acid (concentration of hydrochloric acid in the slurry was 3%) (sample C). This had an oil absorption of 46.

Electrophotographic photosensitive material of the present invention was produced in the same manner as in Example 1 or 2 and photosensitivity, dark decay and specular gloss were measured in the same manner as in Example 1. The results are shown in Table 1.

COMPARATIVE EXAMPLE 1

Example 1 was repeated except that the calcination temperature was 1000° C. The resulting product had an oil absorption of 18 (sample D).

An electron microscopic photograph of this product is shown in FIG. 3.

COMPARATIVE EXAMPLE 2

The slurry obtained by introducing the fired product into water in Example 1 was water-ground for 1 hour in a paint conditioner (filled with zirconia beads; manufactured by Red Devil Co.) and thereafter treated in the same manner as in Example 1. The product had a reduced oil absorption of 27. (sample E).

COMPARATIVE EXAMPLE 3

Figure 4:
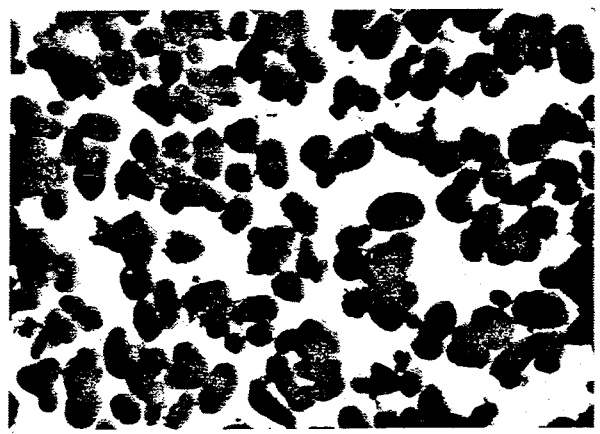

Comparative Example 2 was repeated except that the resulting calcined product was made into an aqueous slurry and sufficiently ground by a sand grinder to obtain titanium dioxide (sample F). This product had an oil absorption of 21 and electron microscopic photograph of this titanium dioxide is shown in FIG. 4.

Electrophotographic photosensitive materials were prepared in the same manner as in Example 1 using the titanium dioxide obtained in Comparative Examples 1-3 and photosensitivity, dark decay and specular gloss were measured in the same manner as in Example 1. The results are shown in Table 1.

TABLE 1

| | Sample | Photosensitivity (second) | Dark decay (%) | Gloss ratio |
|---|---|---|---|---|
| Examples | A | 2.27 | 12 | — |
| | B | 1.14 | 14 | 0.74 |
| | C | 1.26 | 16 | 0.73 |
| Comparative Examples | D | Desired decay did not occur even with exposure of 10 seconds or longer | 17* | — |
| | E | 4.10 | 15 | — |
| | F | 2.95 | 25 | 2.45 |

*A considerable long time was required for obtaining desired charge potential.

As can be seen from the results shown in Table 1, samples A, B and C of the present invention were superior in photosensitivity and dark decay to the comparative samples D, E and F.

The present invention provides titanium dioxide aggregates and the titanium dioxide aggregates treated with a mineral acid, which are applicable to electrophotographic photoconductors, substrates for conductivity-imparting agent or antistatic agent, catalysts or catalyst carriers and fillers and are especially suitable for electrophotographic photoconductors; a process for producing the same; and electrophotographic photosensitive material containing the same. Thus, the contribution of the present invention to industries is great.

What is claimed is:

1. Titanium dioxide aggregates for use in an electrophotographic photoconductor which comprises sintered aggregates of fine primary particles having a rutile type structure, an aggregate size of 1 to 5 μm and an oil absorption of 35 to 65.

2. Titanium dioxide aggregates for use in an electrophotographic photoconductor, treated with a mineral acid which comprise sintered aggregates of fine primary particles having a rutile type structure, an aggregate size of 1 to 5 μm and an oil absorption of 35 to 65.

3. The titanium dioxide aggregates for use in an electrophotographic photoconductor according to claim 1, which are obtained by allowing to be present at least one compound containing an element selected from the group consisting of lithium, zinc, magnesium, calcium, strontium and barium in the course of production or growth of crystal of titanium dioxide.

4. The titanium dioxide aggregates for use in an electrophotographic photoconductor according to claim 2, which are obtained by allowing to be present at least one compound containing an element selected from the group consisting of lithium, zinc, magnesium, calcium, strontium and barium in the course of production or growth of crystal of titanium dioxide.

5. An electrophotographic photosensitive material which comprises an electroconductive support and, laminated thereon, a photosensitive layer consisting essentially of titanium dioxide and a binder wherein said titanium dioxide is in the form of titanium dioxide aggregates which comprise sintered aggregates of fine primary particles having a rutile type crystal structure, an aggregate size of 1 to 5 μm and an oil absorption of 35-65.

6. The electrophotographic photosensitive material according to claim 5, wherein the titanium dioxide aggregates are obtained by allowing to be present at least one compound containing an element selected from the group consisting of lithium, zinc, magnesium, calcium, strontium and barium in the course of production or growth of crystal of titanium dioxide.

7. The electrophotographic photosensitive material according to claim 5, wherein the titanium dioxide aggregates are one which is treated with a mineral acid.

8. The electrophotographic photosensitive material according to claim 6, wherein the titanium dioxide aggregates are one which is treated with a mineral acid.

9. The electrophotographic photosensitive material according to claim 7, wherein the mineral acid is hydrofluoric acid.

10. The electrophotographic photosensitive material according to claim 8, wherein the mineral acid is hydrofluoric acid.

11. The electrophotographic photosensitive material according to claim 5, wherein the gloss ratio of specular gloss at 45°—14° and specular glass at 45°-0° of the surface of the photosensitive layer is 0.7-2.

12. The electrophotographic photosensitive material according to claim 6, wherein the gloss ratio of specular gloss at 45°—14° and specular glass at 45°-0° of the surface of the photosensitive layer is 0.7-2.

13. The electrophotographic photosensitive material according to claim 7, wherein the gloss ratio of specular gloss at 45°—14° and specular glass at 45°-0° of the surface of the photosensitive layer is 0.7-2.

14. The electrophotographic photosensitive material according to claim 8, wherein the gloss ratio of specular gloss at 45°—14° and specular glass at 45°-0° of the surface of the photosensitive layer is 0.7-2.

15. The electrophotographic photosensitive material according to claim 9, wherein the gloss ratio of specular gloss at 45°—14° and specular glass at 45°-0° of the surface of the photosensitive layer is 0.7-2.

16. The electrophotographic photosensitive material according to claim 10, wherein the gloss ratio of specular gloss at 45°—14° and specular glass at 45°-0° of the surface of the photosensitive layer is 0.7-2.

* * * * *